March 28, 1967 I. ABRAMS 3,311,851

HYBRID JUNCTION FOR WAVEGUIDE AND CO-AXIAL CABLE

Filed June 5, 1964

INVENTOR.
Irving Abrams by Greene and Durr

ATTORNEYS 3,311,851

HYBRID JUNCTION FOR WAVEGUIDE AND CO-AXIAL CABLE

Irving Abrams, Glen Rock, N.J., assignor to Premier Microwave Corporation, Port Chester, N.Y., a corporation of New York Filed June 5, 1964, Ser. No. 372,948
7 Claims. (Cl. 333—11)

This invention relates to microwave couplings, and particularly to a hybrid junction for coupling a waveguide and a co-axial cable to a common load circuit, while preventing transfer of energy between the waveguide and the co-axial cable.

In testing microwave components, as for example, in a laboratory, it may be desirable to supply either of two test frequencies to the component. For maximum convenience and saving of time, the circuitry should be such as to permit simple switch over to the source of frequency desired.

In certain cases, energy from one source may be available through a wave guide conduit system, and in another case the energy may be available through a co-axial cable system.

It is therefore desirable to have a suitable coupling device that is static and that serves to connect a test apparatus or a load circuit to either source without disturbing one coupling connection in order to establish another coupling connection.

In order to obtain such selectivity in a static device, a multi-port hollow chamber enclosure is utilized and arranged to provide the functional features of a hybrid junction in selective energy transfer, while, at the same time providing ports of appropriate form to accommodate microwave modes to be received from available supply sources.

One object of the present invention is to provide a static coupling for transferring energy from either of two sources, as selected, to a connected circuit element leading to a component or load circuit.

Another object of this invention is to provide a simple multi-port coupling device with two input ports for two sources, and that shall function as a hybrid junction to selectively transfer energy from one selected port, of said two input ports, to a selected output port.

In accordance with the invention, a hollow enclosure is shaped to provide two separate chambers each of size and shape to constitute a waveguide, with a wall section common to the two waveguides, and with two inlet ports spaced from each other and disposed to straddle the common wall section in such manner that the mode of an input microwave at either inlet port will be different from the input microwave at the other inlet port, whereby each inlet port and its connected external microwave conduit will not be receptive to the micro-wave mode from said other inlet port. However, the input energy from either inlet port will sub-divide equally and enter the two separate chambers and traverse them as waveguides to individual output ports at their respective outlet ends. The microwave mode will determine whether the sub-divided waves are in phase or out of phase.

The construction of the hybrid junction and its manner of operation are described and explained in more detail in the following specification and the accompanying drawings, in which:

FIG. 9 (*a*) is a schematic representation of the electric and the magnetic fields in the co-axial system, and FIG. 9 (*b*) is a schematic representation of the electric field disposition and intensity in the waveguide.

Figures 1, 2, 3, 4, 5, 6, 7, 8, 9A, 9B:
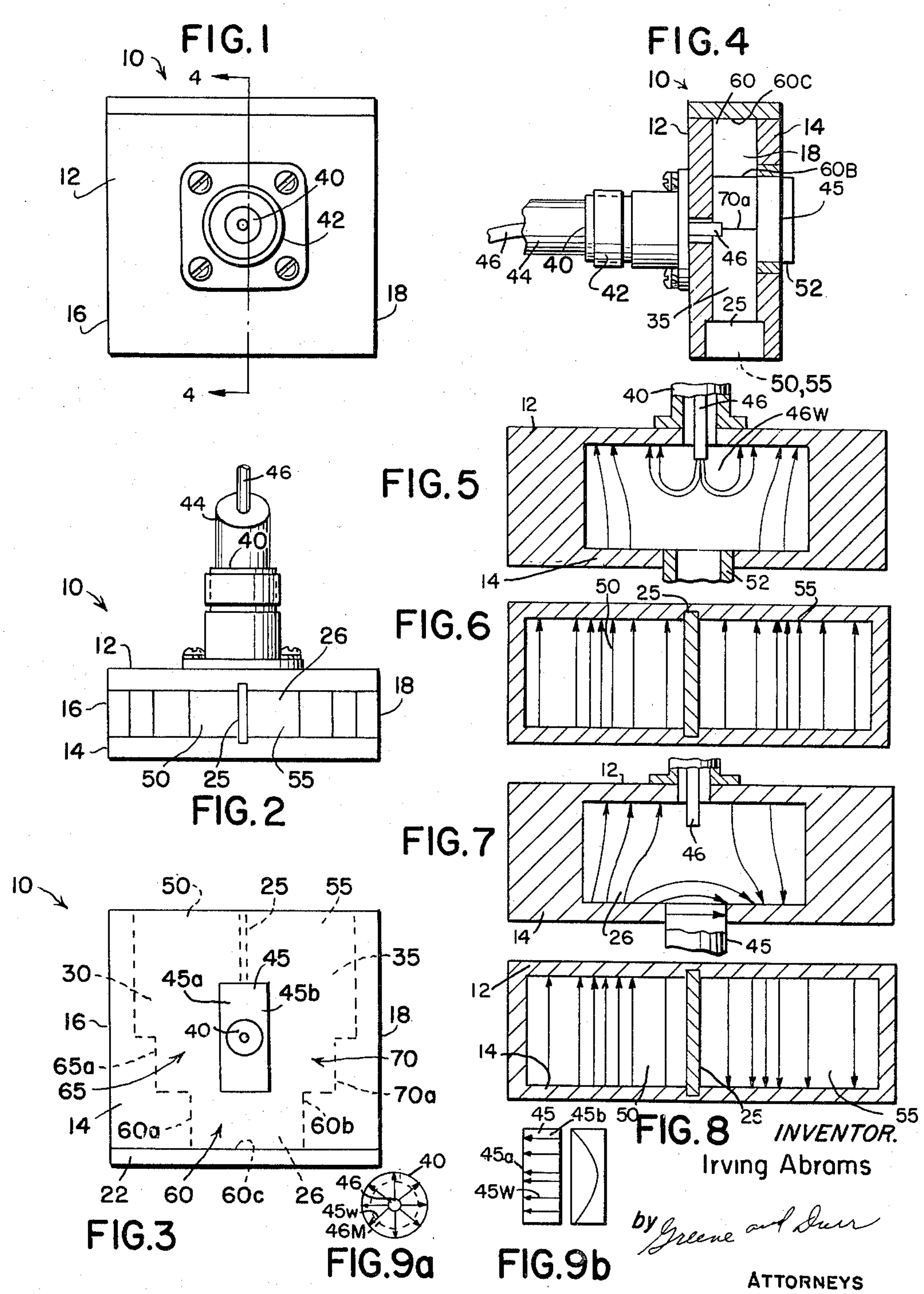
FIG. 1 is a plan view of the hybrid junction, showing a co-axial type coupling for one input port.
FIG. 2 is a front end elevational view showing the two output ports.
FIG. 3 is a bottom view showing a second input port of rectangular shape disposed to straddle the common wall section between the two inner waveguides.
FIG. 4 is a vertical section taken along line 4—4 of FIG. 1 and shows the axial disposition of the inner conductor of the co-axial cable as a probe, and its co-axial alignment with the inlet port of the waveguide.
FIG. 5 is a schematic representation of the electric field moving off the probe and into the hybrid chamber.
FIG. 6 is a schematic representation of the electric field moving out of the two exit ports.
FIG. 7 is a schematic representation of the electric field moving out of the waveguide and into the hybrid chamber.
FIG. 8 is a schematic representation of the electric field from the waveguide moving out of the two exit ports.

As shown in FIGS. 1 to 4, a hybrid junction 10, embodying the invention, comprises a top plate 12, a bottom plate 14, two side walls 16 and 18, and a rear closure wall 22. A central wall partition 25 divides the internal cavity 26 into two compartments to constitute and serve as two waveguides 30 and 35 to transfer energy from either of two input ports 40 and 45 to two output ports 50 and 55, respectively. The partition 25 serves as a common wall between.

The first input port 40 is provided with a co-axial cable coupling 42, and the second input port 45 is provided with a suitable rectangular coupling device, indicated simply as a rectangular conduit section 52.

The hybrid junction may be dimensionally designed for specific frequencies, which will determine the appropriate dimensions of the internal waveguide compartments 30 and 35 in the main cavity of the hybrid junction enclosure. Similarly, the dimensions of the input ports and of the output ports will be correspondingly governed. Thus, the standard conventional dimensions of a rectangular waveguide for a specified frequency will determine the corresponding dimensions of the input port 45 to which the outside conducting waveguide 54 is to be coupled. Likewise, the cable connector or coupling 42 will be of appropriate dimensions to accept the co-axial cable 44 to be connected to the first input port 40.

As may be seen from FIGS. 1 and 2, the co-axial cable coupling 42 will be disposed to cause the co-axial cable 44 to be coupled in position to locate the inner conductor 46 of the co-axial cable 44 in co-planar alignment with the plane of the common wall partition 25 extended. The inner conductor 46 of the co-axial cable 44 thus directs the electric vector 46-W (FIG. 5) towards the inner surface of the bottom conductive plate 14. The wave energy moves partially backward into rear space 60 (FIG. 3), between side wall and rear defining surfaces **60*a*, 60*b* and 60*c*, and also moves partially sidewards into side spaces 65 and 70 between side wall surfaces 65*a* and 70*a*, and moves partially forward toward and into guide passages 30 and 35. The voltage vector 46-W established between the top plate 12 and the bottom plate 14 continues in the same phase into both guide passages 30 and 35. The magnetic mode form accommodates itself to the wider space 65–70 and the narrower rear space 60, with appropriate compression and reflection to move forward and reinforce the forwardly moving magnetic mode field forms. All of the forward moving energy is subdivided by the partition 25 and the two energy streams move out in phase through the two guide passages 30 and 35**, as shown in FIG. 6.

None of that energy from the co-axial cable can enter the second input port 45, since the orientation of input port 45 will transmit only a microwave mode form whose voltage vector is perpendicular to the two long sides 45-*a* and 45-*b*, as shown in FIGS. 5 and 9(*b*).

Conversely, wave energy that enters the rectangular port 45, as in FIGS. 3 and 9, has a mode form with its voltage vector disposed perpendicularly to the two long sides 45-*a* and 45-*b* and its magnetic field mode form parallel to the two long sides 45-*a* and 45-*b*. Such magnetic field mode form is not of proper shape to enter and traverse the co-axial cable, represented by port 40 in FIG. 9(*a*). Therefore no energy from rectangular guide input port 45 can enter cable input port 40, which requires a transverse circular magnetic field form, as represented by dotted circle 46-M in FIG. 9(*a*).

The energy from rectangular input port 45 subdivides vectorially into two portions upon entering the internal chamber 26. A schematic explanation, although non-rigorous, is sufficient for present purposes, as shown in FIGS. 7 and 8.

Consider, for example, that the voltage vector divides in its middle and that the two vector components respectively swing around their terminal connections at the respective sides 45-*a* and 45-*b*, to turn, as at a corner, to engage the inner surface of the opposite plate 12. The pivoted end of each vector component is already at the inner surface of the bottom plate 14. The related magnetic mode field energy also sub-divides, each part going with its related voltage vector field component to travel as a microwave into the related guide passage 30 or 35 and out through ports 50 and 55. The two subdivided voltage vector field components are now out of phase as they pass through guide passages to the two outlet ports 50 and 55.

The inner side and end wall surfaces 60-*a*, 60-*b* and 60-*c*, and the side surfaces 65-*a* and 70-*a* are spaced and dimensioned to achieve the bending of the mode field path, and may be variously modified in accordance with known practices to achieve mode path bending, within the spirit and scope of the invention as defined in the claims.

I claim:

1. A waveguide-to-co-axial hybrid junction, comprising
a hollow enclosure defining a cavity;
a partition to subdivide the cavity into two chambers, each chamber being provided with an opening to constitute a port, said partition being supported to expose a top edge and a bottom edge;
first means defining a rectangular port straddling said partition at one edge for coupling to a waveguide for transmitting a microwave mode having its electric vector transverse to said partition;
and second means defining an equivalent circular port straddling said partition at its other edge, for coupling to a co-axial guide, for transmitting a microwave mode having its electric vector parallel to said partition, to be perpendicular to the electric vector of the wave mode for the rectangular waveguide, whereby energy input from a coupled rectangular waveguide cannot travel to the circular port, and energy input from a coupled co-axial waveguide cannot travel to the rectangular port.

2. A hybrid junction for coupling an input waveguide and an input co-axial cable to a common load, and for preventing transfer of energy between the input waveguide and the co-axial cable, said junction comprising
a hollow enclosure having top and bottom walls and two relatively parallel outer side walls, and an intermediate partition between and parallel to said side walls, said partition and side walls defining two waveguide spaces each closed at one end and each open at the other end to constitute a port for connection to an external circuit;
a circular port in the top wall of the enclosure and disposed to straddle said partition and serving for connection to an external co-axial cable;
and a rectangular port in the bottom wall of said enclosure and disposed to straddle said partition with the longitudinal axis of said port parallel to, and in the plane of the medial plane of said partition.

3. A hybrid junction for coupling an input waveguide and an input co-axial cable to a common load, and for preventing transfer of energy between the input waveguide and the co-axial cable, said junction comprising
a hollow box enclosure having top and bottom plates; rear and side walls between said top and bottom plates;
a partition to subdivide a portion of the space therein into two parallel waveguide passages;
a circuit coupler on the top plate for coupling the center conductor of said co-axial cable into said enclosure with the microwave mode having its voltage mode form perpendicular to the bottom plate;
and a circuit coupler on the bottom plate for coupling a waveguide thereto having form and dimension to transmit a microwave mode having voltage mode form parallel to said bottom plate.

4. A hybrid junction, as in claim 3, in which said partition is vertically disposed between said top and bottom plates.

5. A hybrid junction, as in claim 4, in which said partition is aligned co-axially between said two circuit couplers.

6. A hybrid junction, as in claim 5, in which said side walls are provided with internal oppositely facing shoulders for wave mode form conversion.

7. A hybrid junction, as in claim 6, in which said side walls are formed and disposed relative to said rear wall to achieve both wave mode form conversion and wave reflection.

References Cited by the Examiner

UNITED STATES PATENTS

| | | | |
|---|---|---|---|
| 3,036,279 | 5/1962 | Heeren et al. | 333—21 X |
| 3,077,565 | 2/1963 | Riblet | 333—11 X |
| 3,192,489 | 6/1965 | Walker et al. | 333—11 |

ELI LIEBERMAN, *Primary Examiner.*

M. NUSSBAUM, *Assistant Examiner.*